United States Patent [19]

Urben

[11] Patent Number: 5,702,515
[45] Date of Patent: Dec. 30, 1997

[54] STABILISED SOLUTIONS OF POLYSACCHARIDE

[75] Inventor: Peter George Urben, Kenilworth, United Kingdom

[73] Assignee: Courtaulds Fibres (Holdings) Limited, London, United Kingdom

[21] Appl. No.: 809,399

[22] PCT Filed: Oct. 19, 1995

[86] PCT No.: PCT/GB95/02466

§ 371 Date: Mar. 21, 1997

§ 102(e) Date: Mar. 21, 1997

[87] PCT Pub. No.: WO96/12761

PCT Pub. Date: May 2, 1996

[30] Foreign Application Priority Data

| Oct. 20, 1994 | [GB] | United Kingdom | 9421134 |
| Feb. 10, 1995 | [GB] | United Kingdom | 9502650 |

[51] Int. Cl.$^6$ .................... C08L 1/02; C08L 5/00; C09D 101/02; C09D 105/00
[52] U.S. Cl. ................... 106/200.2; 106/200.3; 106/217.5; 264/561
[58] Field of Search .............. 106/200.2, 200.3, 106/217.5, 217.6; 264/561

[56] References Cited

U.S. PATENT DOCUMENTS

| 2,179,181 | 11/1939 | Graenacher et al. |
| 4,246,221 | 1/1981 | McCorsley, III. |
| 4,426,228 | 1/1984 | Brandner et al. |
| 5,354,371 | 10/1994 | Wykes et al. |

FOREIGN PATENT DOCUMENTS

| 47929 | 3/1982 | European Pat. Off. |
| 158656 | 1/1983 | Germany. |
| 4244609 | 7/1994 | Germany. |
| 1144048 | 3/1969 | United Kingdom. |

*Primary Examiner*—David Brunsman
*Attorney, Agent, or Firm*—Hawson & Howson

[57] ABSTRACT

The use together of (1) an aromatic compound containing a benzene ring bearing at least two substituents selected from the group consisting of hydroxy groups, primary amino groups and secondary amino groups and (2) a sulphur-containing compound containing an —SH group or an anion or precursor thereof, not being a carbocyclic arenethiol, is effective in stabilising solutions of polysaccharides such as cellulose in tertiary amine N-oxides against thermal degradation. Such solutions are useful for the manufacture of extruded articles such as fibers and films.

19 Claims, No Drawings

5,702,515

STABILISED SOLUTIONS OF POLYSACCHARIDE

FIELD OF THE INVENTION

This invention relates to methods of stabilising solutions of polysaccharides such as cellulose useful as spinning or casting dopes for making shaped polymer articles such as fibres and films.

Tertiary amine N-oxides (which may also be referred to for convenience as amine oxides) in hydrated form are susceptible to degradation, particularly at elevated temperatures and at certain lower levels of hydration, both of which conditions are conditions which favour the dissolution of organic polymers such as polysaccharides in the amine oxides. Degradation results in a loss of amine oxide, which is an expensive solvent, and degradation can give rise to discolouration of the solvent and any polymer dissolved in it. It is also known that amine oxides may decompose exothermally at elevated temperatures. It is further known that polysaccharides such as cellulose dissolved in an amine oxide solvent may degrade (suffer reduction in molecular weight) at elevated temperatures.

In the manufacture of fibres and film, it is usually desirable to employ as high a polymer concentration in the spinning dope as is compatible with suitable spinning viscosities. It is also often desirable to utilise a polymer of high molecular weight in the production of fibres and film with superior mechanical properties. Dope viscosity increases with increasing polymer concentration and molecular weight, but it decreases with increasing temperature. In general, the difficulty and expense of processing a dope rise with increasing viscosity. Accordingly, it is frequently desirable to operate at elevated temperature for reduced dope viscosity, subject to technical constraints such as the thermal stability of the dope. It is an object of the invention to provide solutions of polysaccharides in amine oxides which have improved thermal stability and can be processed at high temperatures.

BACKGROUND ART

The manufacture of shaped polymer articles by extrusion of a solution of cellulose in a tertiary amine N-oxide into an aqueous coagulating bath is described for example in U.S. Pat. No. 4,246,221, the contents of which are incorporated herein by way of reference. Such a process may be referred to as a solvent-spinning process.

EP-A-47,929 discloses that the degradation of cellulose in solution in amine oxide can be reduced by including in the solution a compound containing at least four carbon atoms and two conjugated double bonds and two hydroxyl or primary, or secondary amino groups. Examples of suitable compounds include ascorbic acid, pyrogallol, gallic acid and its esters, especially its propyl ester, hydroquinone and p-phenylenediamine. To prevent degradation of the cellulose the solution does not need to contain more than 0.5 percent by weight of the compound in question based on the weight of the amine oxide, 0.01 percent if the compound is propyl gallate. The solution may include non-solvents for cellulose such as water, lower alcohols, dimethyl formamide, dimethyl sulphoxide and high-boiling amines.

DD-A-158,656 discloses that the degradation of cellulose in solution in amine oxide can be diminished by including in the solution up to 10 percent by weight of a substance capable of reducing the amine oxide. Suitable reducing agents include nitrogenous compounds such as amines, urea, hydroxylamine and hydrazine; reducing sulphur compounds such as sulphite, thiosulphate, dithionite, thiourea and elemental sulphur; and reducing C—, H— and O-containing compounds such as aldehydes and reducing sugars.

DISCLOSURE OF THE INVENTION

According to the invention there is provided a solution of a polysaccharide in a hydrated tertiary amine N-oxide, characterised in that it contains (1) an aromatic compound containing a benzene ring bearing at least two substituents selected from the group consisting of hydroxy, groups, primary amino groups and secondary amino groups and (2) a sulphur-containing compound containing an —SH group or an anion thereof or a precursor of such a compound, provided that the said sulphur-containing compound is not a carbocyclic arenethiol.

The polysaccharide is preferably cellulose. A cellulose derivative, for example a cellulose ether, may also be used. Mixtures of polysaccharides may be used. The concentration of the polysaccharide in the solution is generally in the range 5 to 30, often 15 to 25, percent by weight.

The tertiary amine N-oxide may be any of those known as solvents for cellulose and other polysaccharides, as described for example in U.S. Pat. No. 2,179,181 and GB-A-1,144,048, the contents of which are incorporated herein by way of reference. The latter specification describes cyclic tertiary amine N-oxides and these are the preferred solvents used in the present invention, particularly N-methylmorpholine N-oxide, which combines effectiveness as a solvent with thermal stability.

In the manufacture of fibres and film, it is usually desirable to employ as high a polymer concentration in the spinning dope as is compatible with suitable spinning viscosities. By this criterion, amine oxides are most effective as solvents in the hydrated state for polymers. The optimum water content of the solvent varies according to the particular amine oxide used and the particular polymer which it is used to dissolve. For cellulose a suitable general range is 1 to 30 percent by weight of water based on the weight of solvent, with a range of about 5 to about 20 percent being preferred when the amine oxide is N-methylmorpholine N-oxide.

The aromatic compound present in the polysaccharide solution should be readily oxidisable, and therefore at least two of the substituents should be in the ortho- or pare-relationship with respect to each other. Examples of suitable aromatic compounds include polyphenols such as hydroquinone, pyrogallol, gallic acid and its esters, particularly propyl gallate, polyamino compounds such as p-phenylenediamine, and hydroxyamino compounds such as p-aminophenol. Polyphenols, particularly those bearing three phenolic hydroxyl groups on adjacent carbon atoms, may be preferred. The concentration of the aromatic compound in the solution is preferably in the range 0.01 to 0.5, more preferably 0.01 to 0.1, percent by weight.

The sulphur-containing compound is preferably chosen for cheapness and low odour. Suitable (and non-limiting) examples of such compounds include thiols such as the monomeric amino acid cysteine, thiourea (which has a thiol tautomer), thioglycollic acid, thioglycerol, mercaptothiadiazole, mercaptobenzothiazole, mercaptobenzimidazole and mercaptopropionic acid. It is thought that the —SH group in these compounds may be ionised to a substantial extent in the solution of polysaccharide in amine oxide (pH often in the range 9 to 13). Other examples of such compounds include thiocyanate salts, for example metal, ammonium and amine thiocyanates, thiosulphate salts and sulphide salts. When such salts contain a metal cation, it is usually an alkali metal cation such as sodium. Precursors of such sulphur-containing compounds include thioesters susceptible of hydrolysis in the solution at working temperatures and thioethers capable of undergoing a retro-Michael reaction. Other precursors include the salts of oxyanions of sulphur susceptible to disproportionation to thiosulphate, sulphide and the like in the solution at working temperatures. The concentration of the sulphur-containing compound in the solution is preferably in the range 0.05 to 1.0, more preferably 0.1 to 0.5, percent by weight.

It has been found that carbocyclic arenethiols, including thiophenol and its derivatives, are unsuitable for use in the invention because they decompose in the presence of amine oxides at elevated temperatures. Accordingly, the cellulose solution of the invention is not obtained if such compounds are used. It is thought that these sulphur-containing compounds may be oxidised by amine oxide to disulphides or to sulphonic acids at these elevated temperatures. It has also been found than thiosemicarbazide and derivatives thereof, including thiosemicarbazones, are unsuitable for use in the invention. Such compounds have been observed to be rapidly oxidised with the liberation of nitrogen in a hot solution of a polysaccharide in an amine oxide. It is not known whether such compounds form a compound containing an —SH group or an anion thereof (a thiol or thiolate tautomer) in amine oxide solutions but if they do so they and those compounds are excluded from the present invention.

Adducts of the aromatic compound and the sulphur-containing compound may be used, as may single compounds which combine the functionalities of the two types of compound. Mixtures of aromatic compounds and/or of sulphur-containing compounds may be used.

The solution may also contain one or more other miscible solvents and non-solvents for the polysaccharide in known manner.

The solutions according to the invention exhibit improved stability to thermal degradation of the amine oxide compared with solutions containing solely an aromatic compound as defined above or solely a compound containing an —SH group or an anion thereof as defined above. This is remarkable in that such sulphur-containing groups are readily oxidisable, and it might have been expected that the amine oxide would rapidly oxidise them at elevated temperatures, thus accelerating degradation of the amine oxide. Furthermore, such oxidation would produce disulphides, which have been found to be ineffective as stabilisers for amine oxides.

The invention further provides a process for making a shaded article of a polysaccharide, including the steps of:

(a) dissolving the polysaccharide in a hydrated tertiary amine N-oxide to form a solution;

(b) extruding the solution through a die to form a shaped member;

(c) passing the shaped member through at least one water-containing bath, thereby removing the solvent from the shaped member and forming the shaped article; and (d) drying the shaped article, characterised by incorporating in the solution (1) an aromatic compound containing a benzene ring bearing at least two substituents selected from the group consisting of hydroxy groups, primary amino groups and secondary amino groups and (2) a sulphur-containing compound containing an —SH group or an anion thereof or a precursor of such a compound, provided that the said sulphur-containing compound is not a carbocyclic arenethiol. The polysaccharide is preferably cellulose. The tertiary amine N-oxide is preferably N-methylmorpholine N-oxide. The shaped article may be in the form of fibres (which may be preferred) or film.

The polysaccharide has to be mixed with the hydrated amine oxide solvent to effect dissolution. It is advantageous if that solvent has a water content in excess of the level required to give the desired water content of the solution. The excess water promotes an even distribution of the polysaccharide and solvent, and in the case of woodpulp it promotes swelling of the cellulose fibres to aid dissolution. An even distribution is important because high local concentrations of polysaccharide can give rise to undesirable gel formation. Once a uniform dissolving process is under way, then the water content of the solvent may be reduced, for example by evaporation using a thin-film evaporator such as a Filmtruder (Trade Mark), to the level specified as optimum. A suitable initial water content of the solvent for use with woodpulp is in the range 10 to 50 percent by weight.

In the method of the invention, the solution may be stored and transported at temperatures in the range of about 100° to about 140° C., often about 110° to about 130° C. It will be understood that the temperature of the solution may be varied during the dissolution, storage, transporting and extrusion steps. The temperature of the solution as it is transported through pipes may be controlled in the manner described in U.S. Pat. No. 5,354,371, the contents of which are incorporated herein by way of reference.

The effect of various additives and mixtures of additives on the thermal degradation of tertiary amine N-oxides was assessed by the following Test Procedure, which was used in the subsequent Examples:

TEST PROCEDURE

In general, the major primary thermal decomposition product of a tertiary amine N-oxide is the tertiary amine. The following procedure provides a simple comparative method of assessing additives for their efficacy in retarding decomposition of an amine oxide against thermal degradation by assessment of the rate of tertiary amine formation.

A mixture comprising dissolving-grade woodpulp (1.0 g), N-methylmorpholine N-oxide (NMMO) (12.6 g of a recycled mixture containing 62% by weight NMMO and the balance water) and the additive to be tested was heated in a glass beaker placed in a vacuum oven (pressure approx. 250 mm Hg-33 kPa) at 95° C. The cellulose dissolved in the solvent as water was removed to give solutions (dopes) nominally containing 10% by weight cellulose. Although not all solutions will have contained identical amounts of the major components, in general all the samples used in a particular series of experiments were prepared at the same time and any differences in composition are not considered to have had any significant effect on the results.

Portions of dope (1.5–1.6 g) were placed in glass screw-top vials (10 ml capacity), and the tops were screwed down tightly, in some cases after flushing the vials with nitrogen. The vials were then heated (pyrolysed) in an oven at a nominal 130° C. for a specified number of hours. Although oven temperature may not have been the same in all experiments, all the samples used in any particular series of experiments were heated at the same time. Preliminary experiments had shown that some degradation was observable at temperatures of 120° C. and above.

At the end of the specified period, the vials were removed from the oven, allowed to cool for 3–4 minutes, opened and charged with deionised water (4.5 g). The dope was lightly stirred (if stirrable) or scraped from the sides and bottom of the vial (if not stirrable), and the vial was left to stand to equilibrate for 2 or more days with occasional shaking. In some experiments, the contents of the vial were basified to ensure that the N-methylmorpholine was present as the free amine rather than as the amine salt.

An aliquot of the aqueous layer (1.0 g) was weighed into a smaller vial, generally after filtration through cotton wool. To this aliquot was added dichloromethane (0.2 ml). The mixture was vigorously shaken for a minute or two and then allowed to settle for several hours. Control experiments showed that this procedure extracted almost all the N-methylmorpholine present into the organic (dichloromethane) layer.

The organic layer was then analysed by gas chromatography (gc). Care was taken to avoid contamination of the gc samples by the aqueous layer, as this was found to give erroneous results. The analysis was carried out on a 6 ft (1.8 m)×4 mm gc column containing 3% OV 225 on Chromosorb WP (Trade Mark) at 70° C. The injection temperature was 200° C. Several injections of each sample are desirable, although reproducibility is good under stable conditions. Retention times (at 50 ml/min nitrogen carrier) were of the order of 0.4 min for dichloromethane, 0.9 min for N-methylmorpholine and 1.2 min for any tail indicating water contamination. The response is sensitive to flame conditions; in general, a hydrogen-rich flame gives larger relative values for N-methylmorpholine and is to be preferred. The concentration of N-methylmorpholine in the organic layer was assessed by integration of the area under the peak and is expressed as an arbitrary number (proportional to concentration). Experience has shown that the confidence limits of measured gc results of 1 or less are wide, that a difference of 0.5 or more between two measured gc results of around 2 can be considered meaningful and that in general the accuracy of the measurements increases as the concentration increases.

The invention is illustrated by the following Examples, in which parts and proportions are by weight unless otherwise specified.

EXAMPLE 1

The control dope contained 0.05% propyl gallate. The test dope contained 0.05% propyl gallate and 0.2% thiourea. Duplicate samples of the dopes were pyrolysed for 4 hours, and the average gc results shown in Table 1 were obtained:

TABLE 1

|  | No. of injections | N-methylmorpholine number |
|---|---|---|
| Control | 3 | 3.6 |
| Control | 4 | 6.0 |
| Control, nitrogen-purged | 4 | 6.7 |
| Control, nitrogen-purged | 4 | 4.8 |
| Test | 3 | 1.4 |
| Test | 3 | 1.9 |
| Test, nitrogen-purged | 4 | 2.6 |
| Test, nitrogen-purged | 4 | 2.4 |

The test samples exhibited markedly less NMMO degradation than the controls in every case. It will be observed that nitrogen-purging had little if any effect on NMMO degradation.

EXAMPLE 2

Control dope 'A' contained no additive, control dope 'B' contained 0.1% propyl gallate and the test dope contained 0.1% propyl gallate and 0.05% cysteine. The gc results shown in Table 2 were obtained after the specified pyrolysis times:

TABLE 2

|  | 3 hours | 4 hours | 5 hours |
|---|---|---|---|
| Control A | 2.7 | 4.9 | 8.6 |
| Control B | 1.9 | 2.9 | 3.6 |
| Test | 0.9 | 1.9 | 2.6 |

EXAMPLE 3

The control dope contained 0.05% propyl gallate. The test dope contained 0.05% propyl gallate and 0.2% fresh cysteine. Samples were pyrolysed for one and four hours. The gc results obtained after pyrolysis for 1 hour were below 1.0 in both cases. The average gc results after 4 hours were 4.4 (6 injections, range 3.9–4.8) for the control dope and 1.7 (5 injections, range 1.3–2.0) for the test dope.

EXAMPLE 4

The following dopes were pyrolysed for 4 hours, and the average gc results shown in Table 3 were obtained:

TABLE 3

| Control (no stabiliser) | 5.9 |
|---|---|
| 0.05% propyl gallate | 3.9 |
| 0.2% propyl gallate | 3.3 |
| 0.2% thiourea | 3.7 |
| 0.05% propyl gallate + 0.2% thiourea | 1.4 |

The sample containing thiourea alone blackened and rapidly became less viscous (within 40 minutes), indicating cellulose degradation. The sample containing both propyl gallate and thiourea had the palest colour after pyrolysis and had retained its viscosity. The gc results clearly indicate synergistic stabilisation in the dope containing both propyl gallate (as polyphenol) and thiourea (as thiol).

EXAMPLE 5

The following dopes were pyrolysed for 6 hours at 135° C. and the average gc results shown in Table 4 were obtained:

TABLE 4

| 0.1% propyl gallate | 8.6 |
|---|---|
| 0.1% propyl gallate + 0.4% sodium thiosulphate | 3.0 |

EXAMPLE 6

The following dopes were pyrolysed at 130° C. for various times and the average gc results shown in Table 5 were obtained:

TABLE 5

|  | 3 hours | 7 hours |
|---|---|---|
| 0.1% propyl gallate | 1.3 | 16.2 |
| 0.1% propyl gallate - 0.2% sodium thiocyanate | 0.7 | 5.4 |

The sample containing sodium thiocyanate developed a pale brown colour during dope preparation but did not thereafter discolour any faster than the control.

EXAMPLE 7

The following dopes were pyrolysed at 130° C. for various times, and the average gc results shown in Table 6 were obtained:

TABLE 6

|  | 3 hours | 6 hours |
| --- | --- | --- |
| No stabiliser | 8.1 | 21.4 |
| 0.1% propyl gallate | 2.9 | 10.3 |
| 0.2% thiosalicyclic acid | 12.5 | 16.6 |
| 0.1% propyl gallate + 0.2% thiosalicylic acid | 9.0 | 17.3 |
| 0.1% propyl gallate + 0.2% dimercaptothia-3,4-diazole | 3.4 | 6.1 |

The dope containing both propyl gallate and thiosalicylic acid (a carbocyclic arenethiol) was inferior to that containing propyl gallate alone and represents a comparative example, not according to the invention. It is thought that the lack of stabilisation may have been the consequence of oxidation of the thiosalicylic acid by NMMO.

EXAMPLE 8

The following dopes were pyrolysed at 130° C. for various times, and the average gc results shown in Table 7 were obtained:

TABLE 7

|  | 3 hours | 5 hours | 7 hours |
| --- | --- | --- | --- |
| No stabiliser | 7.9 | 14.1 | — |
| 0.1% propyl gallate | 2.4 | 9.5 | 18.8 |
| 0.2% thioglycerol | 7.7 | 12.5 | 15.1 |
| 0.1% propyl gallate + 0.2% thioglycerol | 4.7 | 8.2 | 9.4 |

EXAMPLE 9

The following dopes were pyrolysed at 130° C. for various times, and in separate experiments the average gc results shown in Tables 8 and 9 were obtained:

TABLE 8

|  | 3 hours | 6 hours |
| --- | --- | --- |
| No stabiliser | 2.9 | 6.0 |
| 0.1% propyl gallate | 1.0 | — |
| 0.2% n-dodecanethiol | 2.5 | 5.5 |
| 0.1% propyl gallate + 0.2% n-dodecanethiol | 0.7 | — |

TABLE 9

|  | 3 hours | 5 hours |
| --- | --- | --- |
| No stabiliser | 2.3 | 6.8 |
| 0.1% propyl gallate | — | 4.0 |
| 0.1% propyl gallate + 0.2% n-dodecanethiol | — | 2.8 |

EXAMPLE 10

The following dopes were pyrolysed at 130° C. for various times, and the average gc results shown in Table 10 were obtained:

TABLE 10

|  | 3 hours | 7 hours |
| --- | --- | --- |
| No stabiliser | 5.2 | 19.5 |
| 0.1% propyl gallate | 2.3 | 8.6 |
| 0.1% propyl gallate + 0.2% thiourea dioxide | 2.6 | 11.7 |
| 0.1% propyl gallate + 0.2% thiocresol | 3.2 | 10.1 |
| 0.1% propyl gallate + 0.1% methionine | 2.0 | 6.5 |

The methionine-containing sample generated an unpleasant smell during its preparation (methionine is odourless), and the gc trace contained a peak consistent with the presence of dimethyl disulphide, suggestive of slow release of methanethiol. The stench of thiocresol (a carbocyclic arenethiol) vanished well before preparation of that dope was complete, indicative of its oxidation. Thiourea dioxide is neither a compound containing an SH group nor a precursor of such a compound, and the run employing it, like the run employing thiocresol, is a comparative example not according to the invention.

EXAMPLE 11

The following dopes were pyrolysed at 132° C. for various times, and the average gc results shown in Table 11 were obtained:

TABLE 11

|  | 2.5 hr | 4 hr | 5.5 hr |
| --- | --- | --- | --- |
| 0.05% propyl gallate + 0.31% tartaric acid | — | 2.11 | 4.03 |
| 0.05% propyl gallate | 1.03 | 1.95 | 4.21 |
| 0.05% propyl gallate + 0.27% triethylenediamine | — | 1.83 | 3.39 |
| 0.05% propyl gallate + 0.10% tartaric acid | 0.82 | 1.58 | 2.56 |
| 0.05% propyl gallate + 0.10% thiourea | 0.89 | 1.53 | 2.80 |
| 0.05% propyl gallate + 0.10% thiourea + 0.27% triethylenediamine | 0.89 | 1.57 | 2.84 |

The acidified dopes were all slightly paler in colour than the others and remained so throughout the pyrolysis. The additional stabilising effect of the sulphur-containing compound thiourea appears to become more marked during the later stages of pyrolysis.

EXAMPLE 12

The following dopes were pyrolysed at 112° C. for various times, and the average gc results shown in Table 12 were obtained:

TABLE 12

|  | 20 hr | 38 hr |
| --- | --- | --- |
| 0.05% propyl gallate | 1.75 | 4.18 |
| 0.05% propyl gallate + 0.10% thiourea | 1.46 | 2.64 |

COMPARATIVE EXAMPLE 1

The control dope contained no stabiliser. The Test dopes (A and B) contained 0.05% fresh cysteine. The average gc results given in Table 13 were obtained after various heating times:

TABLE 13

| Time Hours | Control | Dope A | Dope B |
|---|---|---|---|
| 0 | 0.9 | 1.3 | 1.1 |
| 1 | 1.6 | 1.2 | 1.6 |
| 2 | — | — | 2.2 |
| 3 | 3.7 | 3.7 | — |
| 4 | — | 4.5 | — |
| 5 | 6.9 | 5.6 | 5.4 |

The thiol therefore had at best only a small stabilising effect on NMMO, one which was observable only at the longest heating times.

COMPARATIVE EXAMPLE 2

Test dopes containing sodium metabisulphite, urea, selected dialkyl sulphides (including the amino acid dimer cystine), dialkyl disulphides and hindered secondary amines such as 2,2,6,6-tetramethylpiperidine, alone or together with propyl gallate, were assessed. No sample showed more than slight improvement over control dopes containing propyl gallate as sole additive. Sodium metabisulphite and the disulphide of thioglycerol appeared to accelerate degradation.

I claim:

1. A solution of a polysaccharide in a hydrated tertiary amine N-oxide, comprising (1) an aromatic compound containing a benzene ring bearing at least two substituents selected from the group consisting of hydroxy groups, primary amino groups and secondary amino groups and (2) a sulphur-containing compound containing an —SH group or an anion thereof or a precursor of such a compound, provided that the said sulphur-containing compound is not a carbocyclic arenethiol.

2. A solution according to claim 1, wherein the polysaccharide is cellulose.

3. A solution according to claim 1, wherein the tertiary amine N-oxide is N-methylmorpholine N-oxide.

4. A solution according to claim 1, wherein the aromatic compound is a polyphenol bearing three phenolic hydroxyl groups on adjacent carbon atoms.

5. A solution according to claim 4, wherein the aromatic compound is propyl gallate.

6. A solution according to claim 1, wherein the concentration of the aromatic compound in the solution is in the range 0.01 to 0.5 percent by weight.

7. A solution according to claim 6, wherein the concentration of the aromatic compound in the solution is in the range 0.01 to 0.1 percent by weight.

8. A solution according to claim 1, wherein the concentration of the sulphur-containing compound in the solution is in the range 0.05 to 1.0 percent by weight.

9. A solution according to claim 8, wherein the concentration of the sulphur-containing compound in the solution is in the range 0.1 to 0.5 percent by weight.

10. A process for making a shaped article of a polysaccharide including the steps of:

(a) dissolving the polysaccharide in a hydrated tertiary amine N-oxide to form a solution;

(b) extruding the solution through a die to form a shaped member;

(c) passing the shaped member through at least one water-containing bath, thereby removing the solvent from the shaded member and forming the shaped article; and (d) drying the shaped article, characterised by incorporating in the solution (1) an aromatic compound containing a benzene ring bearing at least two substituents selected from the group consisting of hydroxy groups, primary amino groups and secondary amino groups and (2) a sulphur-containing compound containing an —SH group or an anion thereof or a precursor of such a compound, provided that the said sulphur-containing compound is not a carbocyclic arenethiol.

11. A process according to claim 10, wherein the polysaccharide is cellulose.

12. A process according to claim 10, wherein the tertiary amine N-oxide is N-methylmorpholine N-oxide.

13. A process according to claim 10, wherein the aromatic compound is a polyphenol bearing three phenolic hydroxyl groups on adjacent carbon atoms.

14. A process according to claim 13, wherein the aromatic compound is propyl gallate.

15. A process according to claim 10, wherein the concentration of the aromatic compound in the solution is in the range 0.01 to 0.5 percent by weight.

16. A process according to claim 15, wherein the concentration of the aromatic compound in the solution is in the range 0.01 to 0.1 percent by weight.

17. A process according to claim 10, wherein the concentration of the sulphur-containing compound in the solution is in the range 0.05 to 1.0 percent by weight.

18. A process according to claim 17, wherein the concentration of the sulphur-containing compound in the solution is in the range 0.1 to 0.5 percent by weight.

19. A process according to claim 10, wherein the shaped article is a fibre or film.

* * * * *

UNITED STATES PATENT AND TRADEMARK OFFICE
CERTIFICATE OF CORRECTION

PATENT NO. : 5,702,515
DATED : December 30, 1997
INVENTOR(S) : Peter G. Urben

It is certified that error appears in the above-indentified patent and that said Letters Patent is hereby corrected as shown below:

Col. 2, line 45, replace "pare-" with -- para- --.

Col. 3, line 51, replace "shaded" with -- shaped --.

Col. 9, claim 1, line 7, delete "of such a compound," and insert in place thereof -- which forms a compound containing an -SH group or an anion thereof in the solution at working temperatures --.

Col. 10, claim 10, line 9, replace "shaded" with -- shaped --.

Col. 10, claim 10, lines 17 and 18, delete "of such a compound," and insert in place thereof -- which forms a compound containing an -SH group or an anion thereof in the solution at working temperatures --.

Signed and Sealed this

Fourth Day of May, 1999

Attest:

Q. TODD DICKINSON

*Attesting Officer*       *Acting Commissioner of Patents and Trademarks*